(12) United States Patent
Dzafic et al.

(10) Patent No.: US 7,575,428 B2
(45) Date of Patent: Aug. 18, 2009

(54) MOLDING SYSTEM INCLUDING BODY OVERLAPPING AND SEALING CONDUITS, AMONGST OTHER THINGS

(75) Inventors: Svemir Dzafic, Mississauga (CA); Peter Adrian Looije, Newmarket (CA)

(73) Assignee: Husky Injection Molding Systems Ltd., Bolton Ontario (CA)

( * ) Notice: Subject to any disclaimer, the term of this patent is extended or adjusted under 35 U.S.C. 154(b) by 156 days.

(21) Appl. No.: 11/548,740

(22) Filed: Oct. 12, 2006

(65) Prior Publication Data
US 2008/0086866 A1 Apr. 17, 2008

(51) Int. Cl.
*B29C 45/00* (2006.01)
(52) U.S. Cl. ............ 425/567; 425/192 R; 425/587
(58) Field of Classification Search ............ 425/550, 425/572, 376.1, 587, 588, 567, 192 R
See application file for complete search history.

(56) References Cited
U.S. PATENT DOCUMENTS 4,422,838 A * 12/1983 Iwawaki et al. ............ 425/380
RE34,017 E * 8/1992 Kuhne .................... 285/45
5,554,395 A * 9/1996 Hume et al. ............. 425/549
6,494,703 B2 12/2002 Kestle et al.
6,942,006 B2 9/2005 Kono
2005/0255189 A1 11/2005 Manda et al.

FOREIGN PATENT DOCUMENTS
WO 9500312 1/1995

\* cited by examiner

*Primary Examiner*—Maria Veronica D Ewald

(57) ABSTRACT

Molding system for filling mold with molding material, comprising: extruder, including: barrel configured to process molding material being pushable from barrel; barrel head operatively attached to barrel; screw disposed in the barrel; and screw drive connected to screw; stationary platen support a stationary mold portion; movable platen configured to be movable relative to the stationary platen; and body overlapping and sealing, at least in part, barrel and barrel head, body including: flange received at interface between barrel and barrel head, flange abutting end of barrel, flange abutting end of barrel head; and outer surface protruding from flange into interior of barrel, outer circumferential surface protruding from flange into interior of barrel head, outer surface sealing and overlapping against: (i) inner surface of barrel, and (ii) inner surface of barrel head; and body having coefficient of thermal expansion being: (i) greater than barrel, and (ii) greater than barrel head.

5 Claims, 3 Drawing Sheets

MOLDING SYSTEM INCLUDING BODY OVERLAPPING AND SEALING CONDUITS, AMONGST OTHER THINGS

RELATED APPLICATIONS

Similar subject matter is discussed in the related applications entitled: (i) BARREL HEAD OF EXTRUDER OF MOLDING SYSTEM, BARREL HEAD HAVING OUTER AND INNER PORTIONS, AMONGST OTHER THINGS (Applicant's reference number H-1011-0-US), and (ii) MOLDING SYSTEM HAVING CONDUITS HAVING CONICALLY-SHAPED MATABLE DISTAL ENDS, AMONGST OTHER THINGS (Applicant's reference number H-1032-0-US).

TECHNICAL FIELD

The present invention generally relates to, but is not limited to, molding systems, and more specifically the present invention relates to, but is not limited to, (i) a component of a molding system, including a body configured to overlap and to seal, at least in part, a first conduit and a second conduit, (ii) a molding system, including, a body overlapping and sealing, at least in part, a first conduit and a second conduit, (iii) an extruder, including a body overlapping and sealing, at least in part, a barrel and a barrel head, (iv) a molding system, having, amongst other things a body overlapping and sealing, at least in part, a barrel and a barrel head, amongst other things.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada; www.husky.ca).

World Intellectual Property Organization Patent Number WO 9500312 (Inventor: WOLFF; Published: Jan. 5, 1995) discloses a hot runner distributor for supplying molten thermoplastic materials to hot nozzles at molding tools that has pipe plug-type connections that allow thermal expansion. Each pipe plug-type connection has two mutually aligned pipe ends which surround the runner of molten material and are mutually separated by an expandable joint. Both pipe ends are enclosed in the area of the expandable joint by a common cooling ring. The molten plastic material which solidifies under the action of the cooling ring seals the pipe plug-type connection in the area of the expandable joint.

U.S. Pat. No. 6,942,006 (Inventor: KONO; Published: 13 Sep. 2005) discloses a metal injection molding apparatus with features which reduce the amount of metal which enters a drive mechanism of the apparatus. The apparatus contains an injection chamber having an accumulation portion and a shaft housing portion. The shaft housing may extend all the way to the position of an injection member in a fully retracted position. The accumulation portion and the shaft housing may comprise different vessels attached to each other with an insulating gasket provided therebetween. The insulator material of the gasket is preferably made of asbestos, a heat insulating ceramic or any other suitable heat resistant material. The material to be injected, such as a liquid or thixotropic metal, enters the injection chamber through an entry opening configured in the accumulation portion, and exits the accumulation portion, when injected, through a nozzle aperture configured at an end of the accumulation portion and into the mold. The shaft housing portion may include openings in the sidewalls through which any melt leakage past from the injection member that has not been caught by a series of piston rings may egress. Accordingly, the shaft housing, and gasket, is not configured to experience pressurized melt of molding material.

U.S. published patent application No. 2005/0255189 (Inventor: MANDA, Jan; et al; Published: 17 Nov. 2005) discloses a cooled connection between melt conduits of a runner system to form a seal of at least partially solidified molding material (a metallic molding material). Discloses is a seal in the metal molding system, such as those between melt conduit components of a barrel assembly and a runner system. U.S. No. 2005/0255189 discloses a cooled interface for providing a seal of at least partially solidified molding material between the components of the runner system. A problem with the cooled interface may occur when the amount of heat required to be removed to effect the seal of at least partially solidified molding material is also sufficient to over-cool an adjacent portion of a melt passageway and cause a plug of at least partially solidified molding material to form therein which may affect the proper flow of the molding material therethrough. Others have relied on face seals across a clamped interface between mating faces of adjacent melt conduits. In practice, the mating faces of the melt conduits that form the interface do not adequately conform to one another to affect a reliable seal against the leakage of the generally low viscosity molding material under the injection pressure.

SUMMARY

According to a first aspect of the present invention, there is provided a component of a molding system, including, amongst other things: a body configured to overlap and to seal, at least in part, a first conduit and a second conduit.

According to a second aspect of the present invention, there is provided a molding system, including, amongst other things: (i) a first conduit configured to convey a molding material, (ii) a second conduit configured to convey the molding material, and (iii) a body overlapping and sealing, at least in part, the first conduit and the second conduit.

According to a third aspect of the present invention, there is provided an extruder, including, amongst other things: (i) a first conduit including a barrel, the barrel configured to process a molding material, the molding material being pushable from the barrel, (ii) a second conduit including a barrel head, the barrel head operatively attached to the barrel, (iii) a screw disposed, at least in part, in the barrel, the screw configured to process the molding material disposed in the barrel, and (iv) a screw drive connected to the screw, the screw drive configured to drive the screw, and (v) a body overlapping and sealing, at least in part, the first conduit and the second conduit.

According to a fourth aspect of the present invention, there is provided a molding system, amongst other things: an extruder, including: (i) a first conduit including a barrel, the barrel configured to process a molding material, the molding material being pushable from the barrel, (ii) a second conduit including a barrel head, the barrel head operatively attached to the barrel, (iii) a screw disposed, at least in part, in the barrel, the screw configured to process the molding material disposed in the barrel, and (iv) a screw drive connected to the screw, the screw drive configured to drive the screw. The molding system also including, amongst other things: a stationary platen configured to support a stationary mold portion of a mold, the stationary mold portion configured to receive the molding material from the barrel head, a movable platen configured to be movable relative to the stationary platen, the movable platen configured to support a movable mold portion of the mold, and a body overlapping and sealing, at least in part, the first conduit and the second conduit.

According to a fifth aspect of the present invention, there is provided a hot runner, including (amongst other things): a first conduit configured to convey a molding material, a second conduit configured to convey the molding material, and a body overlapping and sealing, at least in part, the first conduit and the second conduit.

According to a sixth aspect of the present invention, there is provided a method, including (amongst other things): overappling and sealing a body, at least in part, to a first conduit and a second conduit, the first conduit configured to convey a molding material, the second conduit configured to convey the molding material.

A technical effect, amongst other technical effects, of the aspects of the present invention is a reduction, at least in part, in leakage from conduits of a molding system.

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
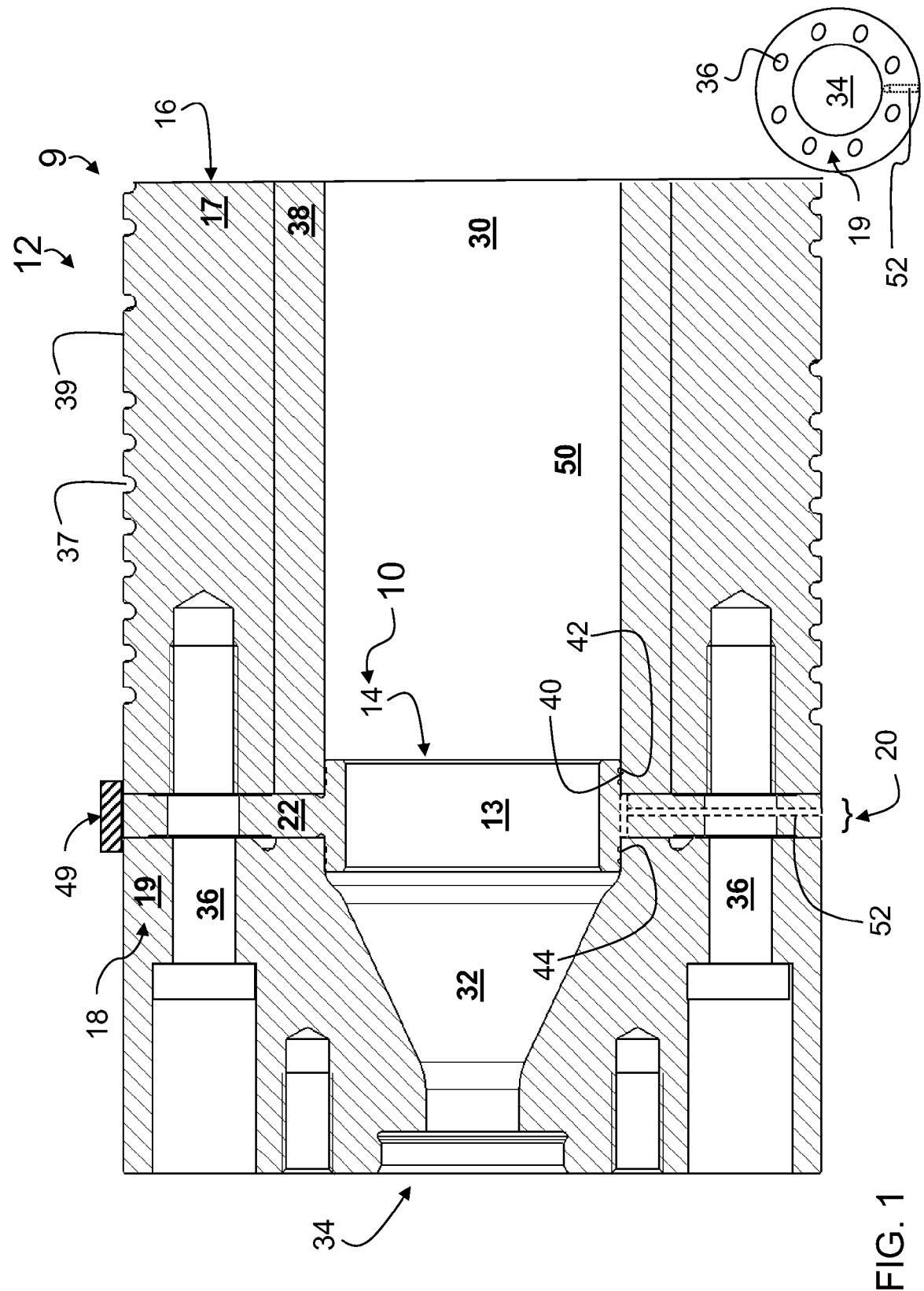
FIG. 1 is a cross-sectional view of a component of a molding system according to a first exemplary embodiment (which is the preferred embodiment)

FIG. 1 is a cross-sectional view of a component 10 of a molding system 12 (depicted in part, and hereafter referred to as the "system 12") according to the first exemplary embodiment. The component 10 includes a body 14 that is configured to overlap and to seal, at least in part, a first conduit 16 and a second conduit 18. For example, the first conduit 16 includes a barrel 17, and the second conduit 18 includes a barrel head 19, and the system 12 includes an extruder 9 (the barrel 17 and/or the barrel head 19 are components of the extruder 9). It will be appreciated that the embodiments of the present invention are not limited to the barrel 17 and the barrel head 19, and that the concept of the present invention is applicable to overlapping and sealing the conduits of the system 12. For ease of describing the exemplary embodiments, the barrel 17 and the barrel head 19 will be used in place of referring to the first conduit 16 and the second conduit 18, respectively; but it is understood that the following description is applicable to the first conduit 16 and the second conduit 18.

Preferably, the body 14 is receivable, at least in part, at an interface 20 between the barrel 17 and the barrel head 19. The body 14 has a coefficient of thermal expansion that is greater than that of the barrel 17. The body 14 has a coefficient of thermal expansion that is greater than that of the barrel head 19. The body 14 is ring shaped or may be shaped to be received and fitted in the barrel 17 and the barrel head 19. The body 14 includes an outer circumferential surface 40 that is sealable and overlappable, at least in part, against an inner circumferential surface 42 of the barrel 17. According to a variant, the outer circumferential surface 40 is sealable and overlappable against, at least in part, an inner circumferential surface 44 of the barrel head 19. According to yet another variant, the outer circumferential surface 40 is sealable and overlappable, at least in part, against the inner circumferential surface 42 of the barrel 17 and as well as the inner circumferential surface 44 of the barrel head 19. The body 14 defines a pathway 13 that extends through the body 14.

Preferably, the body 14 includes a flange 22. The flange 22 is receivable, at least in part, at an interface 20 between the barrel 17 and the barrel head 19. The flange 22 extends radially outward. The flange 22 is positionable between end portions of the body 14.

The barrel 17 defines a channel 30 that extends through the barrel 17. The barrel head 19 defines a passageway 32 that extends through the barrel head 19. The barrel head 19 has in egress end 34 that is connectable to a machine nozzle (not depicted), and the machine nozzle is either connected to a mold 92 (depicted in FIG. 3) or to a hot runner 97 (depicted in FIG. 3). Bolts 36 are used to attach the barrel head 19 to the barrel 17. If the system 12 is used to mold a metallic molding material, then a liner 38 is inserted into the barrel 17. The liner 38 is, preferably, made of Stellite™ supplied by the Deloro Stellite Company (www.stellite.com) located in Goshen, Ind. USA. The barrel 17 is made of Inconel™ supplied by the Special Metals Corporation located in Huntington, W. Va. USA (www.specialmetals.com). A groove 37 is formed on an outer surface 39 of the barrel 17, and the groove 37 receives a heating wire (not depicted); alternatively, a heading band is coupled to the outer surface 39 and the groove 37 is not used.

The system 12, preferably, is a metal molding system that is used to process a metallic molding material, such as an alloy of magnesium, zinc, aluminum, etc.

According to a variant, the component 10 defines a weeping channel 52. Once the seal between the body 14 and the barrel 17 and/or the barrel head 19 is broken, the weeping channel 52 directs leaking molding material 50 from the barrel 17 and/or the barrel head 19 to an exterior of the barrel 17 or of the barrel head 19.

To further clarify the cross-sectional view, located at the bottom right hand corner of FIG. 1 is a front view of the barrel head 19.

Figure 2:
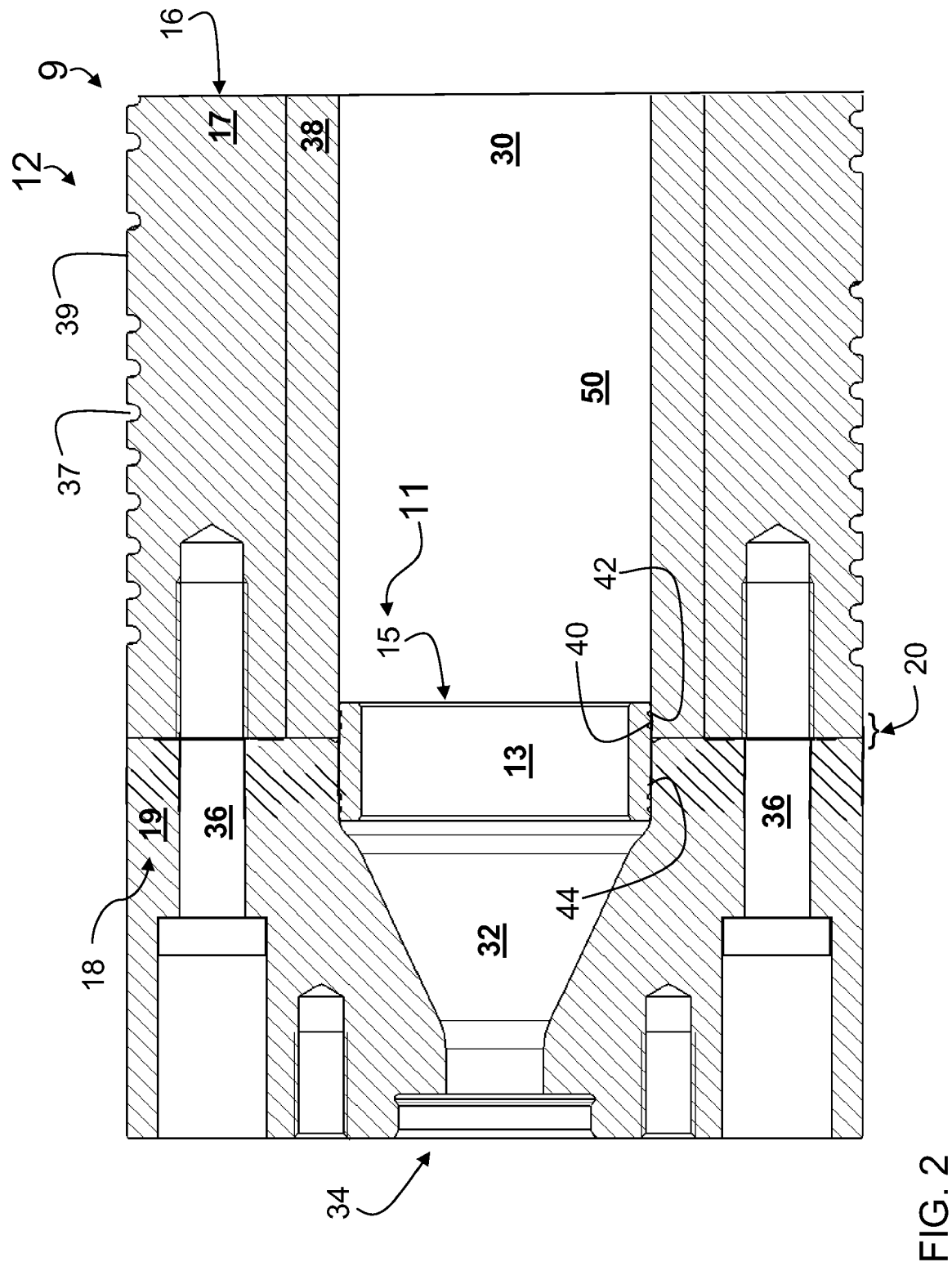
FIG. 2 is a cross-sectional view of a component of a molding system according to a second exemplary embodiment.

FIG. 2 is a cross-sectional view of the component 11 of the system 12 according to a second exemplary embodiment. To facilitate an understanding of the second exemplary embodiment, elements of the second exemplary embodiment (that are similar to those of the first exemplary embodiment) are identified by similar reference numerals. The component 11 (which has a body 15) does not include a flange, such as flange 22 of FIG. 1. According to the second exemplary embodiment, the barrel 17 and the barrel head 19 contact each other at the interface 20.

According to a variant, the body 14 and/or 15 is interference fittable with the first conduit 16 and the second conduit 18. The body 14, 15 is made of the same material as the first and second conduits 16, 18), the body 14, 15 is cooled down relative to the first and second conduits 16, 18 so that the body 14, 15 may slip into the conduits 16, 18, and then once the temperature of the body 14, 15 is equalized, at least in part, the body 14, 15 expands and abuts against the conduits 16, 18 (thus, the body 14, 15 is made to "interference fit" with the conduits 16, 18).

Referring back to FIG. 1, according to a variant of the body 14, the conduits 16, 18 are kept at the same temperature while body 14 is slipped into the conduits 16, 18 and then the body 14 positioned to overlap and seal the interface 20; then, the body 14 is heated (by a heater 49 that is coupled to the body 14) sufficiently enough to as to expand more than the conduits 16, 18 (thus, the body 14 is made to "interference fit" with the conduits 16, 18).

According to another variant, the body 14 and/or 15 is positively attached to the first conduit 16 (for example, by way of welding the body 14, 15 to the first conduit 16) while the body 14 and/or 15 is non-positively attached (that is, not welded, for example) to the second conduit 18. Alternatively, the body 14 and/or 15 is positively attached to the second conduit 18, and the body 14 and/or 15 is non-positively attached to the first conduit 16. For example, the body 14 and/or 15 may be welded to any one of the first and/or second conduits 16, 18.

According to another variant, the body 14 and/or 15 and the first conduit 16 are unitary. Alternatively, the body 14 and/or 15 and the second conduit 18 are unitary. For example: (i) the body 14, 15 and the first conduit 16 is formed from a single unitary body, and/or (ii) the body 14, 15 and the first conduit 18 is formed from a single unitary body.

Figure 3:
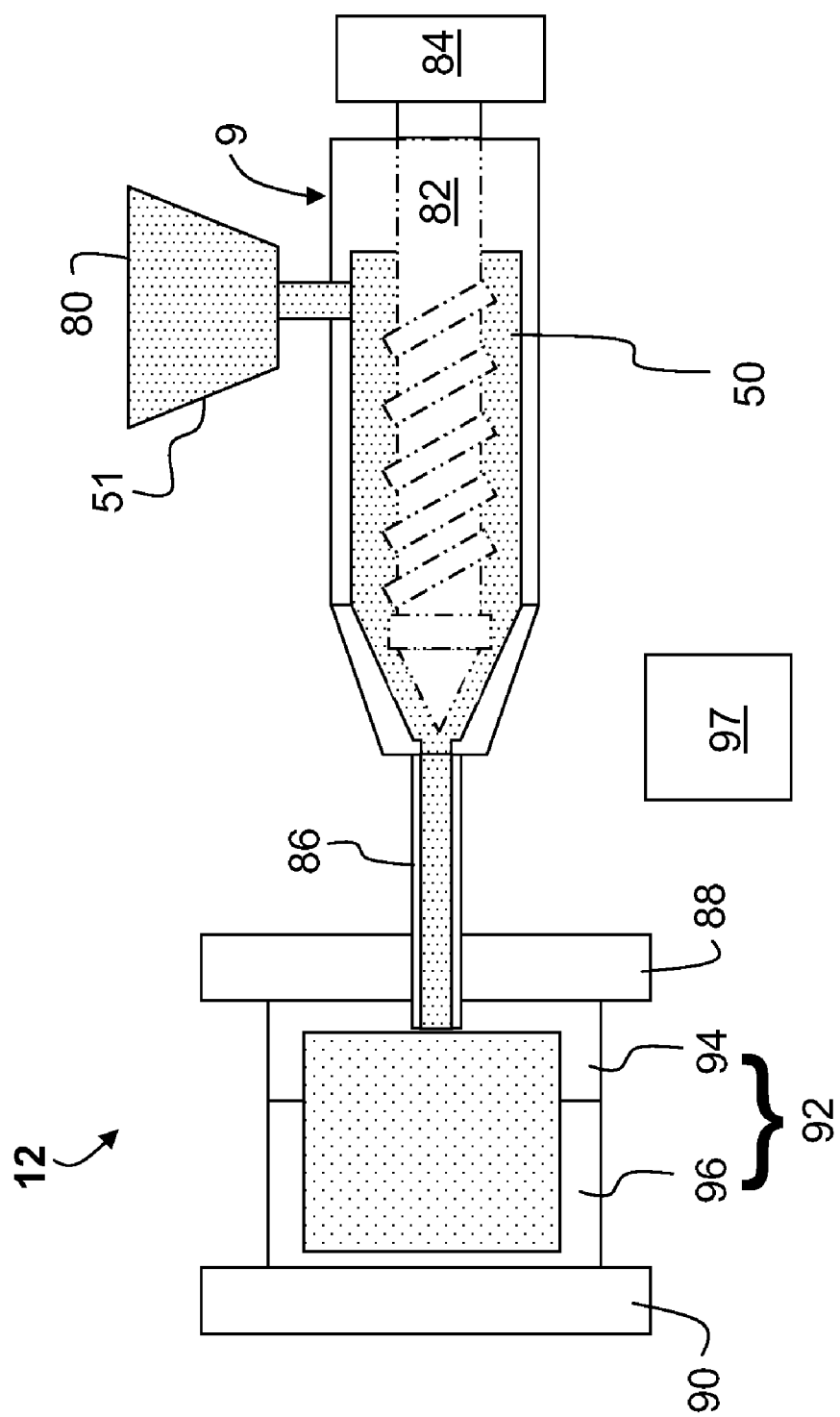
FIG. 3 is a schematic view of a molding system and of an extruder having the component of FIG. 1 and/or FIG. 2, respectively.

FIG. 3 is a schematic view of the system 12 and of the extruder 9 having the components 10 and/or 11 of FIG. 1 and FIG. 2, respectively.

Preferably, the extruder 9 includes (amongst other things): (i) the barrel 17 that is configured to process the molding material 50, the molding material 50 being pushable from the barrel 17, (ii) a barrel head 19 that is attached to the barrel 17, (iii) a screw 82 disposed, at least in part, in the barrel 17; the screw 82 is configured to process the molding material 50 that is disposed in the barrel 17, (iv) a screw drive 84 that is connected to the screw 82; the screw drive 84 is configured to drive the screw 82, and (v) a body 14 and/or 15 overlapping and sealing, at least in part, the barrel 17 and the barrel head 19. A hopper 80 is attached to a feed throat of the extruder 9, and the hopper is used to deliver pellets of meltable, moldable material 51 to the extruder 9. The extruder 9 is used to process (that is, heat and melt) the material 51 into the (molten) molding material 50. A machine nozzle 86 is attached to the barrel head 19 of the barrel 17 of the extruder 9, and the machine nozzle 86 is also attached to the stationary mold portion 94 of the mold 92. The machine nozzle 86 is used to convey the molten molding material 50 from the extruder 9 to a mold cavity defined by the mold 92, in a manner known in the art.

According to a variant, the system 12 includes (amongst other things): (i) the first conduit 16 that is configured to convey the molding material 50, (ii) the second conduit 18 that is configured to convey the molding material 50, and (iii) either one of the bodies 14 and/or 15 (of the component 10 and/or 11, respectively) overlapping and sealing, at least in part, the first conduit 16 and the second conduit 18.

According to another variant, the molding system 12 includes (amongst other things): (i) the extruder 9, (ii) a stationary platen 88 that is configured to support a stationary mold portion 94 of a mold 92; the stationary mold portion 94 is configured to receive the molding material 50 from the barrel head 19, (iii) a movable platen 90 that is configured to be movable relative to the stationary platen 88; the movable platen 90 is configured to support a movable mold portion 96 of the mold 92.

Preferably, the system 12 further includes, amongst other things, tangible subsystems, components, sub-assemblies, etc, that are known to persons skilled in the art (these items are not depicted and not described in detail since they are known). These other things may include: (i) a hot runner 97 (used if required) that is mounted to the stationary platen 88 and the stationary mold portion 94 is then mounted to the hot runner 97 instead of being mounted to the stationary platen 88, (ii) tie bars (not depicted) that operatively couple the platens 88, 90 together, (iii) a clamping mechanism (not depicted) coupled to the tie bars and used to generate a clamping force that is transmitted to the platens 88, 90 via the tie bars (so that the mold 92 may be forced to remain together while a molding material 50 is being injected in to the mold 92), (iv) a mold break force actuator (not depicted) coupled to the tie bars and used to generate a mold break force that is transmitted to the platens 88, 90 via the tie bars (so as to break apart the mold 92 once an article has been molded in the mold 92), (v) a platen stroking actuator (not depicted) coupled to the movable platen 90 and used to move the movable platen 90 away from the stationary platen 88 so that the molded article may be removed from the mold 92, (vi) hydraulic and/or electrical control equipment, and (vii) a controller (not depicted) that is operatively coupled to the system 12 so as to control and coordinate the processes associated with the system 12. According to a variant, the tie bars are not used and the system 12 is then called a tie-barless molding system.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A molding system for filling a mold with a molding material, the molding system comprising:
    an extruder, including:
        (i) a barrel, the barrel configured to process the molding material, the molding material being pushable from the barrel;
        (ii) a barrel head, the barrel head operatively attached to the barrel;
        (iii) a screw disposed, at least in part, in the barrel, the screw configured to process the molding material disposed in the barrel; and
        (iv) a screw drive connected to the screw, the screw drive configured to drive the screw;
    a stationary platen configured to support a stationary mold portion of the mold, the stationary mold portion configured to receive the molding material from the barrel head;
    a movable platen configured to be movable relative to the stationary platen, the movable platen configured to support a movable mold portion of the mold; and a body, the body including:
- a flange being received, at least in part, at an interface between the barrel and the barrel head, the flange abutting the end of the barrel, the flange also abutting the end of the barrel head; and
- an outer circumferential surface protruding from the flange into an interior space of the barrel, the outer circumferential surface also protruding from the flange into an interior space of the barrel head, the outer circumferential surface sealing and overlapping against, at least in part, (i) an inner circumferential surface of the barrel, and (ii) an inner circumferential surface of the barrel head; and the body having a coefficient of thermal expansion being: (i) greater than that of the barrel, and (ii) greater than that of the barrel head.

2. The molding system of claim 1, wherein:
the body is interference fittable with the barrel and the barrel head.

3. The molding system of claim 1, wherein:
the barrel defines a weeping channel that is configured to, once a seal between the body and the barrel is broken, the weeping channel directs leaking molding material out from the barrel to an exterior from the barrel.

4. The molding system of claim 1, wherein:
the flange extends radially outward, and the flange is receivable, at least in part, at the interface between the barrel and the barrel head.

5. The molding system of claim 1, wherein:
the flange is positioned between end portions of the body, and the flange is receivable, at least in part, at the interface between the barrel and the barrel head.

* * * * *